July 9, 1929.   J. FAULDS   1,719,972
OVEN
Filed May 26, 1928   2 Sheets-Sheet 1

Inventor:
John Faulds
By Gillson, Mann & Cox Attys

July 9, 1929. J. FAULDS 1,719,972
OVEN
Filed May 26, 1928 2 Sheets-Sheet 2
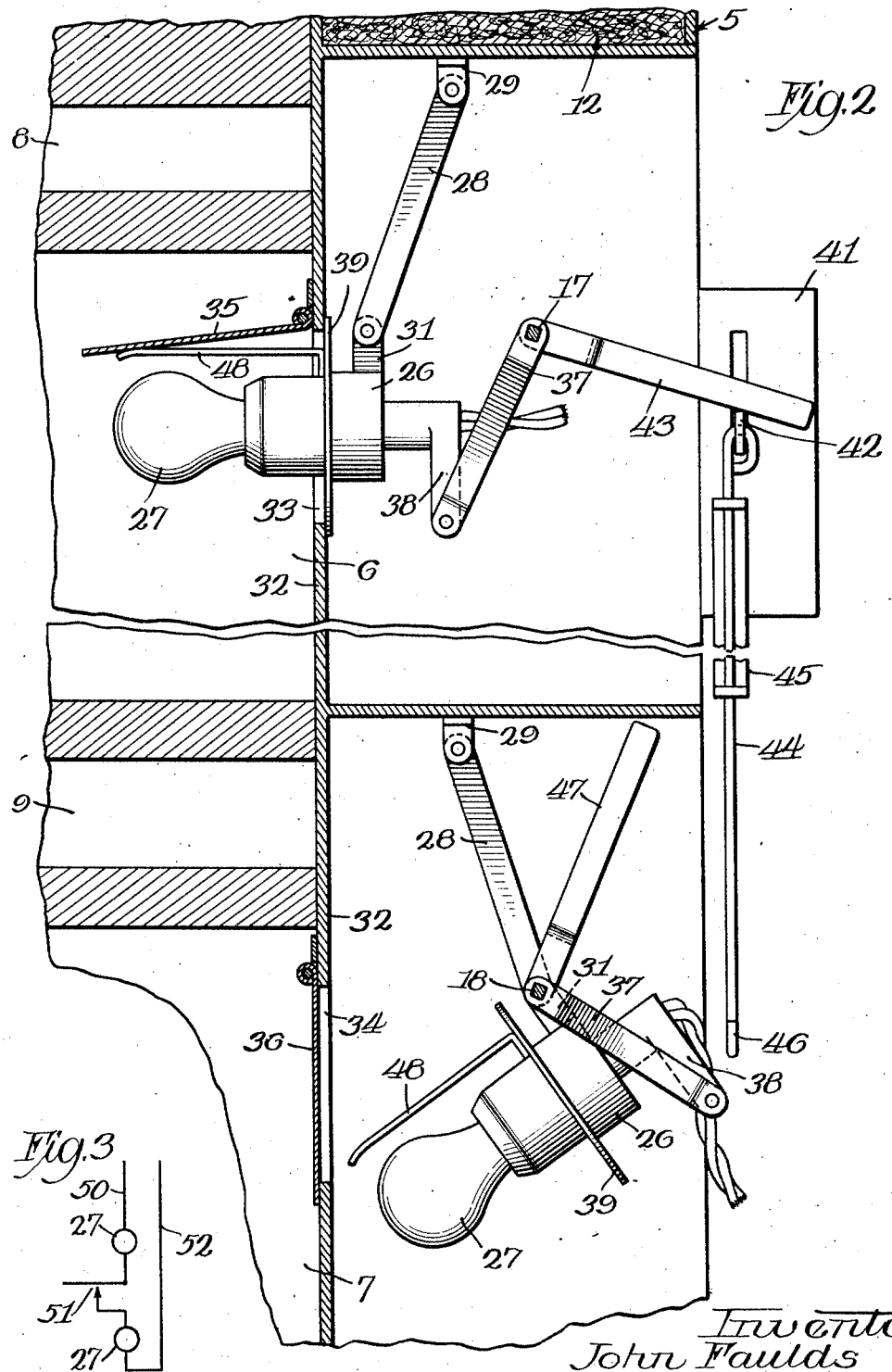
Inventor
John Faulds
By Gillson, Mann Hoxie Attys Patented July 9, 1929.

1,719,972

UNITED STATES PATENT OFFICE.

JOHN FAULDS, OF OAK PARK, ILLINOIS.

OVEN.

Application filed May 26, 1928. Serial No. 280,868.

This invention relates to bake ovens, and more particularly to means for illuminating the baking chambers thereof.

The principal object of the invention is the provision of new and improved means for automatically illuminating the baking chambers of ovens simultaneously with the opening of the oven doors.

Another object of the invention is the provision of new and improved mechanism for illuminating the interior of baking ovens that is simple in construction, cheap to manufacture and install, efficient in operation, economical in use, and that is not likely to become broken or get out of order.

Other and further objects and advantages of the invention will appear from the following description taken in connection with the accompanying drawings, in which Fig. 1 is a front elevation of a baker's oven, with parts broken away;

Fig. 2 is a section on line 2—2 of Fig. 1; and

Fig. 3 is a diagrammatic view of the wiring for the lighting elements.

Figure 1:
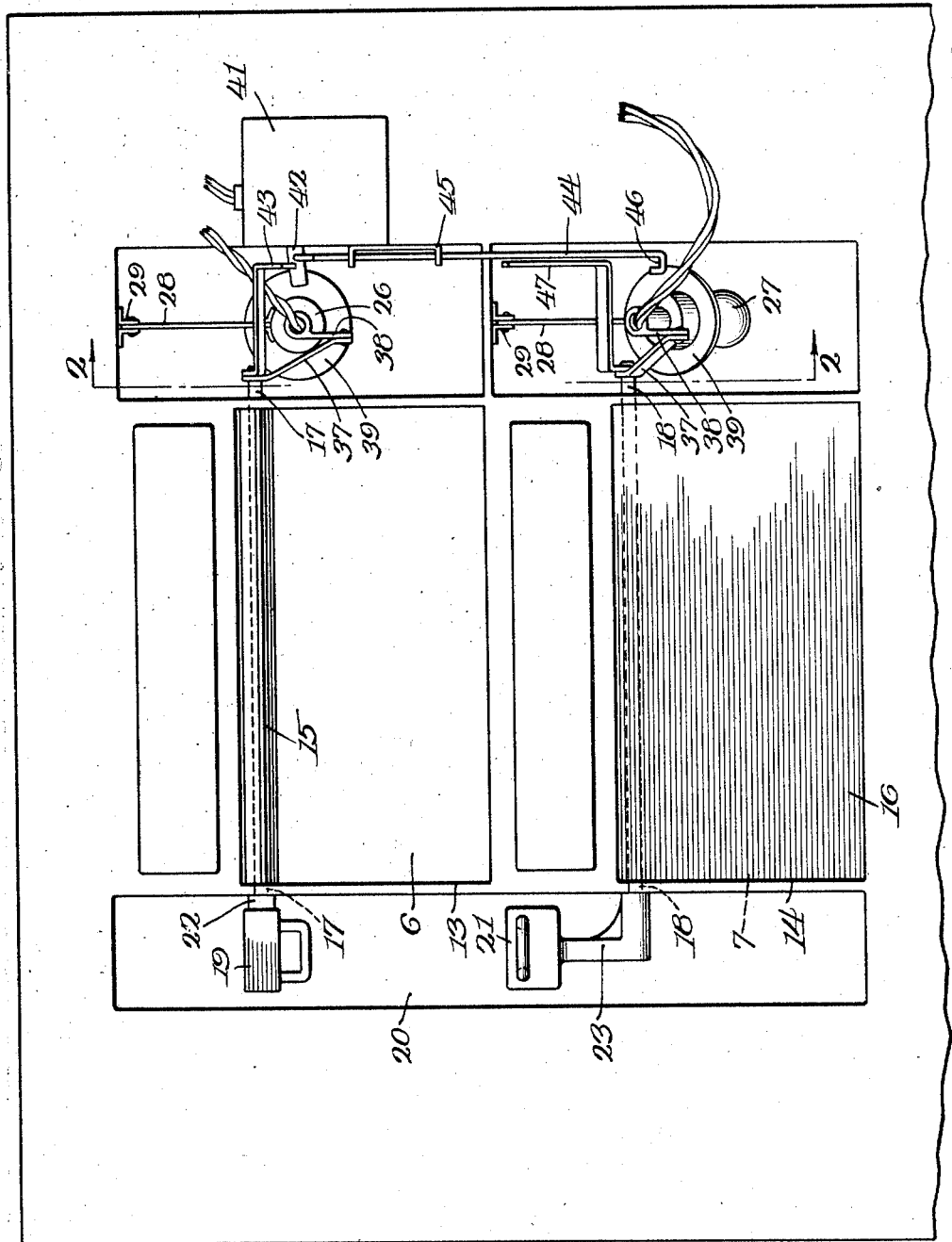

Referring now to the drawings, the reference character 5 designates generally a baker's oven having the upper baking chamber or compartment 6 and the lower baking chamber or compartment 7. Each wall member of the oven is composed of an inner and an outer wall between which is placed suitable insulating material 12. The chambered hearths of these compartments form what may be termed the flue passages 8 and 9.

The front wall of the chambers 6 and 7 are provided with door openings 13 and 14 through which access may be had to said chambers. These openings are adapted to be closed by suitable doors 15 and 16 which are attached at their upper portions to horizontally arranged hinge members 17 and 18 journaled in the front walls of the oven. Counterbalances 19 and 21 mounted on crank arms 22 and 23 integral with or rigidly attached to the hinge members 17 and 18 and operating in a recess 20 in the front wall of the oven are adapted to hold the doors in either open or closed position. Since the details of the general construction of the oven constitute no part of the present invention, it is not thought necessary to further illustrate or describe the same. The oven structure is similar to that illustrated in my Patent No. 1,148,669 granted August 3, 1915.

It is desirable that the interior of the baking chamber or compartment be automatically illuminated when either door is opened to enable the operator to inspect the baking products in the respective chambers. Due to the heat of the chamber it is desirable that the illuminating mechanism be located exteriorly of the baking chamber and that suitable means be provided for projecting the illuminating device into the oven only when the door is opened.

Mechanism for accomplishing this function will now be described.

In the form of the device selected to illustrate one embodiment of the invention, electric lights are employed, as the illuminating devices. The illuminating device and the means for operating it are located in a recess in the front end of the oven, the depth of the recess being substantially the distance between the inner and outer wall of the oven.

There is an illuminating device for each baking chamber. In the form shown, since there are only two chambers, only two illuminating devices are employed. Since these two devices are identical in construction, only one need be described.

The bulb holder or socket 26 containing the electric light bulb 27 is supported by a link 28 pivoted at its upper end to a suitable support 29 and at its lower end to the bracket 31 on said socket. The inner wall 32 of the front end of the oven is provided with the openings 33 and 34 which are adapted to be closed by the flaps or closures 35 and 36 pivoted at their upper ends. The closures 35 and 36 are held in closed position by gravity.

Suitable means are provided for projecting the electric light bulbs 27 through the openings 33 and 34 when the oven doors are open. Any suitable means may be employed for this purpose. As shown, the hinge members 17 and 18 are provided with laterally extending arms 37 rigidly attached thereto. The free ends of the arms 37 are offset and are pivotally connected to a lateral extension 38 on the socket member 26 whereby when the door 13 is open the rotation of the hinge member 17 will cause the arm 37 to project the socket member 26 forwardly, thereby projecting the electric light bulb 27 through the opening 33.

The socket 26 is provided with an annular flange 39 which will limit the inward movement of the socket member 26 and at the same time form a closure for the opening 33 when the bulb is projected forwardly.

Suitable means are provided for energizing the electric light bulb 27 when the same is projected forwardly through the opening 33. As shown, a switch box 41 is secured on the front end of the oven adjacent to the illuminating mechanism. The box is provided with a switch arm 42 which is adapted to be operated by an arm 43 rigidly secured to the outer end of the hinge member 17, whereby when the hinge member 17 is rotated the arm 43 will depress the switch arm 42 for completing the circuit through the bulb 27.

Any suitable electric wiring may be employed; that shown diagrammatically in Fig. 3 is by way of example only. As shown, the bulbs are in series and the current entering by one of the leads, say the lead 50, passes through the upper bulb 27, thence through the switch 51 and the lower bulb 27, back to the main line 52.

While the two bulbs are shown as being connected in series, it is understood that they may be independently wired and have independent switches for closing the circuits.

In order that the switch arm 42 may be moved for closing the circuit when the lower door 14 is operated, a hanger bar 44 is connected to the switch arm 42 and extends downwardly through suitable guides 45 and is provided with a laterally extending projection 46 which is adapted to be engaged by the arm 47 on the door hinge member 18 when said door is opened.

In order to protect the bulbs 27 to prevent the same from coming in contact with the closures 35 and 36, a suitable shield or guard 48 is provided. The shield or guard may be attached to the flange 39 and extends forwardly over the bulb 27, whereby when the bulb is projected through the opening the shield member 48 will engage the closure 35 and elevate the same.

It is thought from the foregoing taken in connection with the accompanying drawings, that the construction and operation of my device will be apparent to those skilled in the art, and that various changes in size, shape, proportion and details of construction may be made without departing from the spirit and scope of the appended claims.

I claim as my invention:

1. In combination, a baker's oven comprising a baking compartment having an opening in its front wall, a movable closure for said opening, a door for said oven, an electric light bulb, means for normally supporting said bulb exteriorly of said compartment, means for energizing said bulb and means for opening said closure and for projecting said bulb into said compartment upon the opening of said door.

2. In combination, a baker's oven having a baking compartment therein, a door for said compartment, said oven having an opening through its wall adjacent to said door, a movable closure for said opening, an electric light bulb, means for movably supporting said bulb adjacent to said opening, and mechanism operated by the opening of said door for projecting said bulb through said opening.

3. In combination, an oven provided with a baking compartment, a door for said compartment, said oven being provided with an opening through its walls adjacent to said door, an electric light bulb, means including a switch for energizing said bulb, means for projecting said bulb into said compartment and for closing said switch simultaneously with the opening of said door.

4. In combination, an oven provided with a plurality of baking compartments, a door for each compartment, said oven having an opening for each compartment, a closure for each opening, an electric light bulb for each compartment, means for movably supporting said bulbs exteriorly of said compartments, means including an electric switch for energizing said bulbs, means for closing said switch and for simultaneously projecting one of said bulbs into one of said compartments when the door to that compartment is opened.

In testimony whereof I affix my signature.

JOHN FAULDS.